3,489,426
COMBINATION GOLF CART AND GOLF BAG
John R. J. Bond, 132 Pleasant Ave., Willowdale,
Ontario, Canada
Filed Jan. 14, 1969, Ser. No. 791,079
Int. Cl. B62b 3/10
U.S. Cl. 280—40    14 Claims

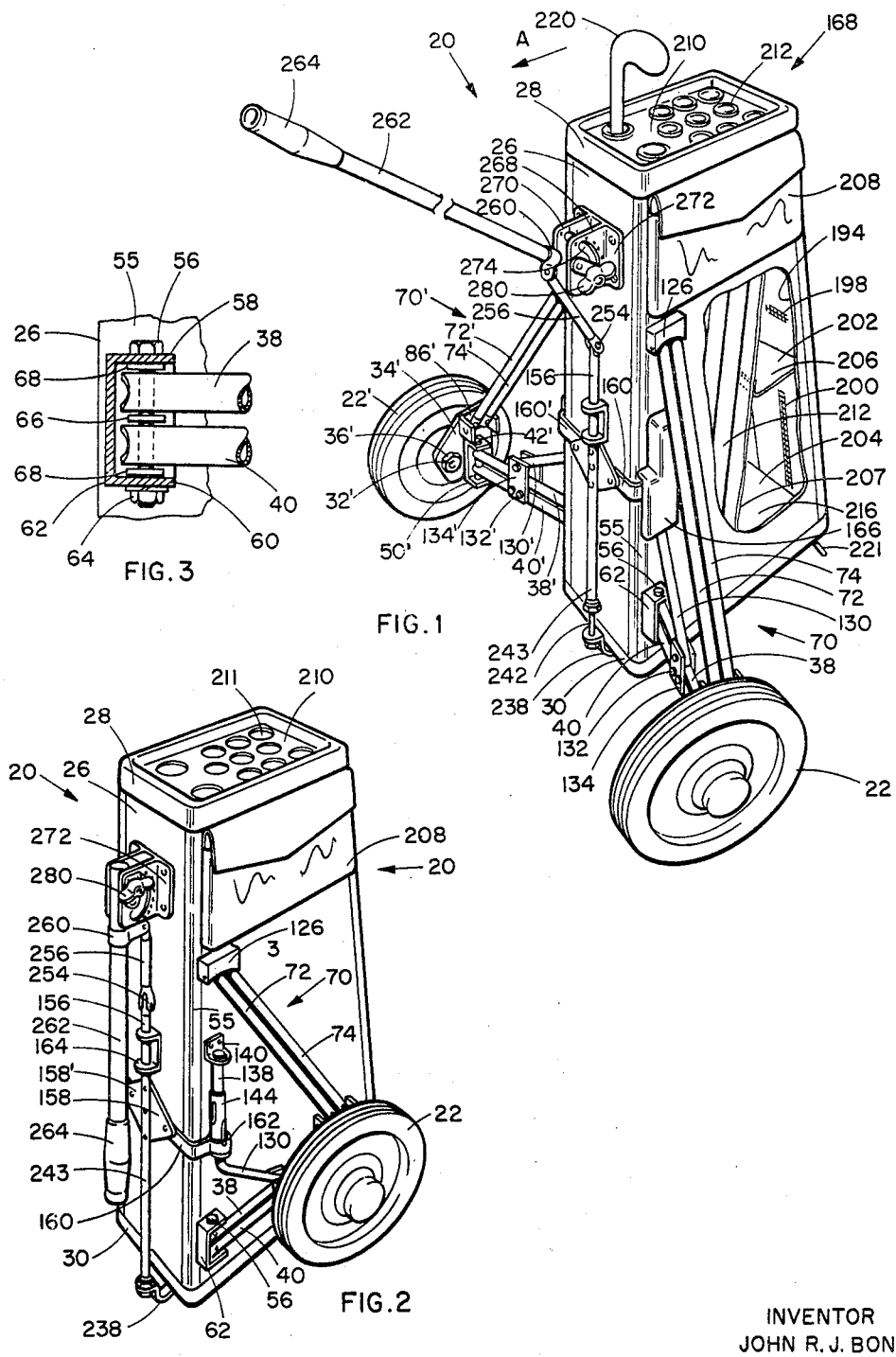

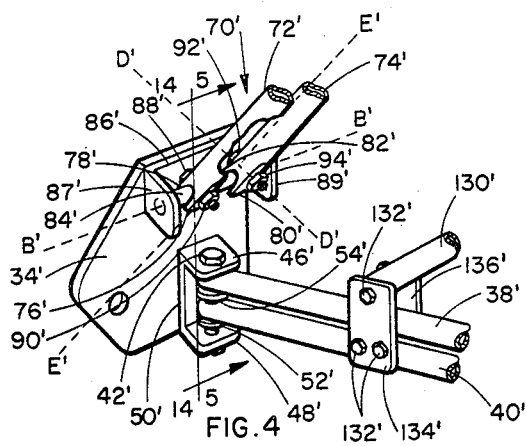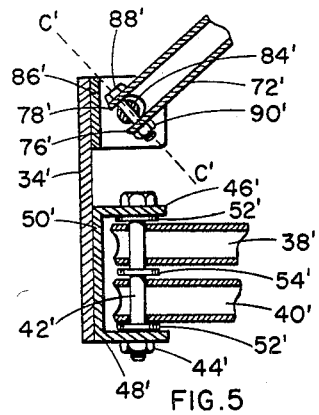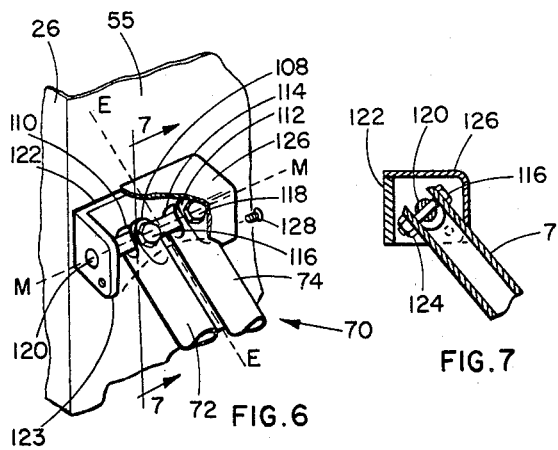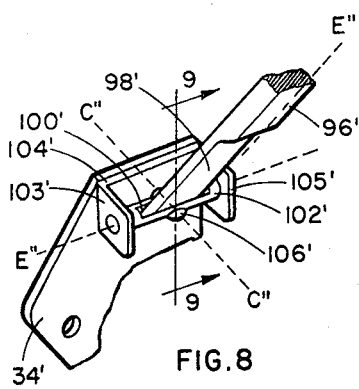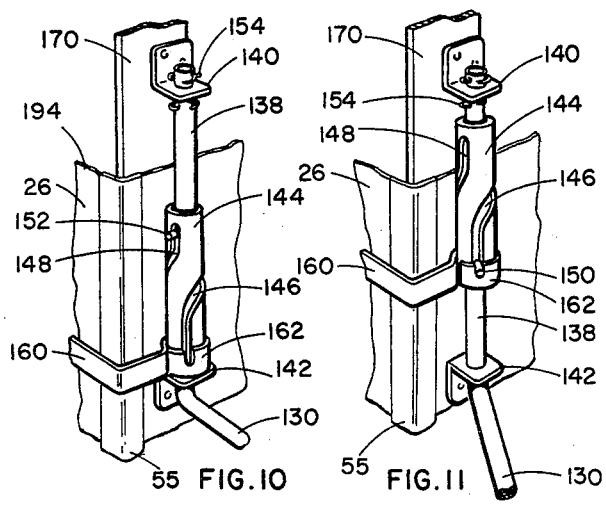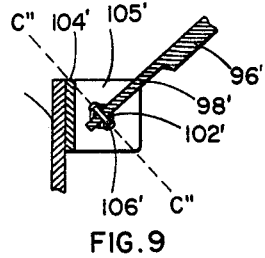
INVENTOR
JOHN R. J. BOND
ATTORNEY Jan. 13, 1970       J. R. J. BOND            3,489,426
           COMBINATION GOLF CART AND GOLF BAG
Filed Jan. 14, 1969                   3 Sheets-Sheet 3
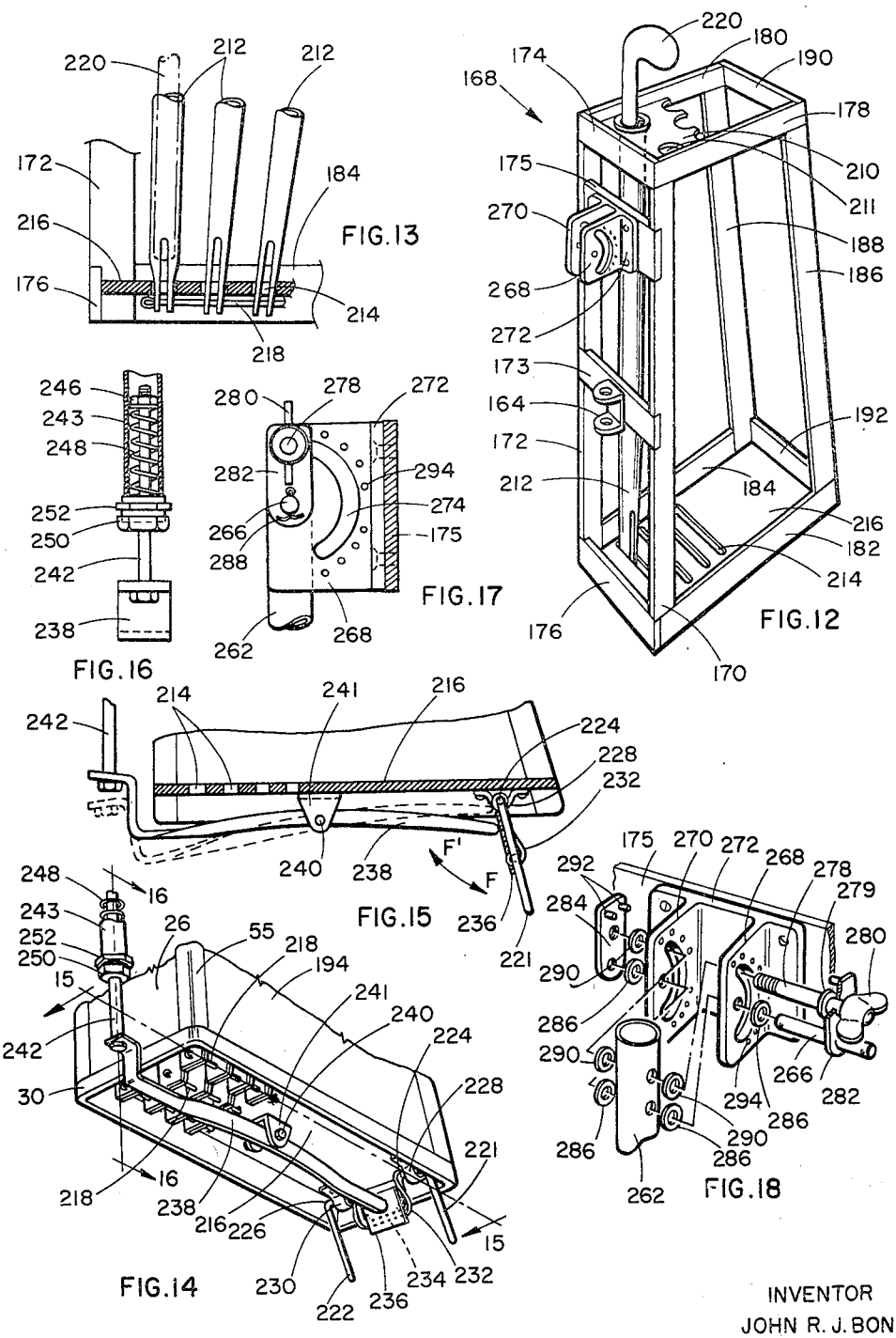
INVENTOR
JOHN R. J. BOND
ATTORNEY United States Patent Office 3,489,426
Patented Jan. 13, 1970

ABSTRACT OF THE DISCLOSURE

A cart having an elongated rigid spine and a pair of ground engaging wheels to be moved between axially aligned extended position transversely displaced from the spine and retracted position in which the wheels are aligned and rearwardly displaced of the spine of the cart.

---

The present invention relates to carts and more particularly to a cart having a wheel adapted to be moved between an extended position and a retracted position. Although the invention provides a retractable wheel-mounting structure suitable for moving a single wheel on a cart, it is especially applicable to a cart having an elongated rigid spine and a pair of ground-engaging wheels which are adapted to be moved between axially aligned extended positions transversely displaced from the spine and retracted positions in which the wheels are transversely aligned and rearwardly disposed of the spine of the cart.

In its broadest scope, the present invention embraces carts with retractable wheels, which carts have numerous possible applications. The structures of the present invention are, for instance, applicable to invalid chairs, racing sulkies and, in fact, to any conveyance or cart on which movement of the wheels between extended and retracted positions is required. When the word "cart" is used herein, it is intended to embrace all such "vehicles."

Although the structures of the present invention have such wide applicability, they are especially intended for use in golf carts, either of the type to which a golf bag may be removably supported or of a novel type with a golf club-receiving container as an essential component thereof.

In its broadest scope, the present invention provides a cart having an elongated rigid spine with a longitudinal axis, an upper end and a lower end, a ground-engaging wheel mounted on a stub axle, said stub axle in turn being mounted on an upright axle-bearing plate to permit rotation of said wheel, a generally horizontal arm pivotally secured to said spine in proximity to said lower end thereof about a first axis substantially parallel to said longitudinal axis of said spine and pivotally secured to said axle-bearing plate about a second axis substantially parallel to said first axis to permit movement of said wheel between an extended position transversely displaced from said spine and a retracted position disposed rearwardly or forwardly of said spine, a rigid elongated planar member having a longitudinal axis, an upper end and a lower end, the lower end of said elongated planar member being pivotally secured to said axle-bearing plate for pivoting movement about mutually perpendicular third and fourth axes each of which is perpendicular to the longitudinal axis of said elongated planar member, the upper end of said elongated planar member being pivotally secured to said spine intermediate said upper end and said lower end of said spine for pivotal movement about fifth and sixth axes parallel to said third and fourth axes respectively, control means comprising a laterally movable element mounted on said spine, a helical gear connecting said laterally movable element of said control means to a drive transmission arm connected in turn to said horizontal arm whereby lateral movement of said laterally movable element imparts rotational movement through said helical gear to said drive transmission arm to move said wheel between said extended position and said retracted position.

As hereinbefore indicated, the present invention is particularly applicable to two-wheeled carts and, in such a cart, each of the two wheels will be mounted on an axle-bearing plate connected to the spine and to the laterally movable element of the control means in the manner hereinbefore specified.

For a cart according to the invention and intended removably to support a golf bag, the cart is usefully adapted to support such a bag rearwardly of its spine and to have both its wheels adapted for movement between axially aligned extended positions transversely displaced from the spine and retracted positions in which the wheels are transversely aligned and rearwardly disposed of the spine. When such a cart has a golf club-receiving structure permanently associated therewith, such a golf club-receiving structure is usefully secured rearwardly of the aforementioned spine.

In accordance with an optional feature of the present invention, such a permanent golf club-receiving structure is usefully provided with a plurality of individual golf club-receiving tubular members, each having an upper end and a lower end, the lower ends of these tubular members being secured against vertical movement to facilitate the removal of golf clubs therefrom and being perforated to permit the drainage of moisture, for example, rainwater, therefrom.

A golf cart having a preferred construction in accordance with the invention is also provided with a retractable handle which is usefully adapted on its movement from its retracted position to its extended position to cause movement of said wheels from their retracted positions to their extended positions. Such a handle may usefully be disposed in alignment with the spine of the cart when it is in its retracted position and extend forwardly and upwardly from such spine when it is in its extended position.

The helical gear used in a cart of the invention is usefully formed as a hollow cylindrical member having a helical slot therethrough and being rigidly secured to the aforementioned laterally movable element for lateral movement therewith. A portion of the drive transmission arm can then be disposed coaxially and rotatably within such a hollow cylindrical member and be provided with a radially outwardly extending pin extending through such a helical slot so that lateral movement of the hollow cylindrical member will cause rotational movement of the drive transmission arm and consequently movement of the associated wheel between its retracted and extended positions. In accordance with a particularly preferred feature of the invention, such a hollow cylindrical member is usefully provided with a pair of diametrically opposed helical slots therethrough for engagement with a pair of diametrically opposed outwardly extending pins provided on the drive transmission arm.

In accordance with yet another feature of the invention, a cart according thereto is usefully provided with a non-rotatable ground-engaging member which is adapted for movement between a lowered ground-engaging position and a raised non-ground-engaging position. Such ground-engaging members are useful for preventing a two-wheeled cart rolling when it is standing on an inclined ground surface. The movement of such a ground-engaging member between its raised and lowered positions is advantageously effected by means of the aforementioned laterally movable element of the control means conjointly with the movement of the wheels between their retracted and extended positions. For example, such a ground-engaging member may be pivotally mounted on a base plate secured to the spine of the cart and may be urged by spring means into its raised position. A lever arm connected to the laterally movable element of the control means and in abutting relationship with such a ground-engaging member may then serve to move the ground-engaging member between its raised and lowered positions on lateral movement of the laterally movable element. For reasons which will become apparent as the description proceeds, it is often useful to incorporate an extensible linkage between the aforementioned lever arm and the laterally movable element.

Two typical structures for pivotally connecting the aforementioned elongated planar member to the spine of a cart and to the axle-bearing plate will be described in greater detail hereinafter.

The invention will now be described merely by way of illustration with reference to the accompanying drawings in which:

FIG. 1 is a perspective view of one embodiment of a collapsible golf cart in accordance with the present invention, with a portion cut away to reveal the internal structure and showing the wheels and the handle in their extended positions as well as showing a single golf club in position therein;

FIG. 2 is a perspective view similar to that of FIG. 1 but with the golf club and the golf club-receiving tubular members omitted and showing the handle and the wheels in their retracted positions, the cover of the helical gearing also being omitted to reveal its underlying structure;

FIG. 3 is an enlarged perspective view of the pivotal mounting provided at the inner end of one of the generally horizontal arms of the cart of FIGS. 1 and 2;

FIG. 4 is an enlarged perspective view of the pivotal mounting of the outer end of one of the generally horizontal arms on the respective axle-bearing plate of the cart of FIGS. 1 and 2, also showing the pivotal mounting on the axle-bearing plate of the lower end of the elongated planar member hereinbefore mentioned;

FIG. 5 is a vertical sectional view along the line 5—5 of FIG. 4;

FIG. 6 is an enlarged perspective view of the pivotal mounting provided at the upper end of one of the elongated planar members of the cart of FIGS. 1 and 2 with part of its cover cut away to reveal the internal structure;

FIG. 7 is a vertical sectional view along the line 7—7 of FIG. 6;

FIG. 8 is an enlarged perspective partial view of an alternative structure for the pivotal mounting used at the lower end of one of the elongated planar members;

FIG. 9 is a vertical sectional view along the line 9—9 of FIG. 8;

FIG. 10 is an enlarged perspective view of one of the helical gears utilized in the cart of FIGS. 1 and 2 showing the relative dispositions of its several structural components when the wheel associated therewith is in its retracted position;

FIG. 11 is a perspective view similar to that of FIG. 10 but showing the relative dispositions of the several structural components of the helical gear when the wheel associated therewith is in its extended position;

FIG. 12 is a perspective view showing the skeletal framework of the golf club-receiving structure of the cart of FIGS. 1 and 2 with a single golf club-receiving tubular member in position therein;

FIG. 13 is an enlarged vertical sectional view through the lower part of the golf club-receiving structure of FIG. 12 showing how several golf club-receiving tubular members are usefully secured therein;

FIG. 14 is a perspective view of the undersurface of the cart of FIGS. 1 and 2 showing the non-rotatable but pivotally mounted ground-engaging members or prongs usefully provided on a cart according to the invention and showing the lever arm mechanism provided for moving such prongs between their retracted positions and their ground-engaging positions (as shown), with certain parts omitted for the sake of clarity;

FIG. 15 is a vertical sectional view along the line 15—15 of FIG. 14 with the golf club-receiving tubular members omitted for the sake of clarity;

FIG. 16 is an enlarged vertical sectional view along the line 16—16 of FIG. 14;

FIG. 17 is an enlarged side elevation of the handle-mounting pivotal assembly of the cart of FIGS. 1 and 2; and FIG. 18 is an enlarged and exploded fragmentary perspective view of the assembly of FIG. 17 showing one of the pair of locating pins provided for locking the handle in any one of its several possible positions.

Referring first to FIGS. 1 and 2 of the accompanying drawings, it will be seen that the cart indicated generally therein at 20 comprises a pair of ground-engaging wheels 22 and 22' connected to a rigid elongated spine 26 of the cart 20 in such a way that they can be moved between the extended positions shown in FIG. 1 and the retracted positions shown in FIG. 2.

Since the cart 20 shown in the drawings is intended for use as a golf cart and since such carts are generally moved along the ground by being pulled by a golfer, references herein to the "forward direction" are intended to signify the direction of the arrow A of FIG. 1. Use of the word "transverse" is intended to signify the horizontal direction perpendicular to the arrow A, i.e. the direction lying transversely across the spine 26. References to the "lateral direction" of the spine 26 are intended to denote the longitudinal direction between the upper end 28 and the lower end 30 of the spine 26. Use of the term "lateral" is adopted herein since, on occasions, the spine 26 will not necessarily be vertically disposed.

Bearing these definitions in mind, it will now be appreciated that the wheels 22 and 22' are mounted on the spine 26 for movement between axially aligned extended positions in which the wheels are transversely displaced from the spine 26 (FIG. 1) and retracted positions in which the wheels are transversely aligned and rearwardly disposed of the spine 26.

Since the wheels 22 and 22' are mounted on the spine 26 in essentially identical manners, unprimed legends will be used for describing the mounting of wheel 22 while the corresponding primed legends will be used for describing the corresponding mounting of wheel 22'. Detailed descriptions of the structures of both the mountings will not be given since the description of one can be applied directly to the other. The description which follows hereinafter will, therefore, for convenience be given with reference to whichever structure is illustrated more clearly in the accompanying drawings.

FIG. 1 shows that the wheel 22' is mounted on a stub axle 32' which in turn is mounted on an upright axle-bearing plate 34'. In the embodiment illustrated, the wheel 22' is freely rotatable on the stub axle 32' while the latter is non-rotatably secured to the axle-bearing plate 34' by a nut 36'. It will be appreciated, however, that the wheel 22' may be non-rotatably secured to the stub axle 32' and the latter may then alternatively be rotatably mounted in the axle-bearing plate 34'.

The axle-bearing plate 34' is connected to the spine 26 by a generally horizontal arm formed from two tubular members 38' and 40', each of which is pivoted about a first axis formed by a bolt 42' disposed substantially parallel to the longitudinal axis of the spine 26. As shown in FIGS. 4 and 5, the bolt 42' is secured by nut 44' to the generally horizontal flanges 46' and 48' of a U-shaped bracket 50' in turn secured to the axle-bearing plate 34' in any appropriate manner, for example, by welding. Washers 52' are interposed around the bolt 42' between the tubular members 38' and 40' and the flanges 46' and 48' respectively of the bracket 50' and a single washer 54' on the bolt 42' separates the tubular members 38' and 40'. In the embodiment illustrated, the bolt 42' is non-rotatably secured by the nut 44' and the tubular members 38' and 40' are conjointly rotatable with respect to the bolt 42'. Alternatively, the tubular members 38' and 40' may be non-rotatably secured to the bolt 42' and the latter rotatably mounted on the bracket 50'.

At their inner ends, the tubular members 38, 40 and 38', 40' are pivotally secured to the transverse side edges 55 and 55' respectively of the spine 26. In the case of tubular members 38 and 40, it will be seen from FIG. 3 that these members are pivotally mounted by a bolt 56 passing through holes in the ends of tubular members 38 and 40 and that this bolt 56 is secured in position through generally horizontal flanges 58 and 60 of a mounting bracket 62 by means of a nut 64. A washer 66 is disposed on the bolt 56 between the tubular members 38 and 40 and washers 68 are provided on the bolt 56 between the tubular members 38 and 40 and the flanges 58 and 60 of the bracket 62. The bolt 56 being parallel to bolt 42 and to the longitudinal axis of the spine 26 permits the required movement of the wheel 22 between its extended position shown in FIG. 1 and its retracted position shown in FIG. 2.

The axle-bearing plates 34 and 34' are also connected to the side edges 55 and 55' respectively of the spine 26 by rigid elongated planar members generally indicated at 70 and 70' respectively. The planar member 70' is pivotally secured at its upper end to the side edge 55' of the spine 26 and at its lower end to the axle-bearing plate 34' in a manner which will be described hereinafter in greater detail.

Referring more particularly to FIGS. 4 and 5, it will be seen that the rigid elongated planar member 70' is made up of two elongated tubular members 72' and 74', each of which terminates at its lower end in a pair of axially extending tongues 76', 78' and 80', 82' respectively. The tongues 76' and 78' are disposed in diametrically opposed tangential abutment to a generally horizontal and generally cylindrical shaft 84' pivotally mounted in the flanges 87' and 89' of a U-shaped bracket 86' secured in turn to the axle-bearing plate 34'. A bolt 88' extends freely through each of the tongues 76' and 78' and diametrically through the shaft 84'. A nut 90' serves to retain this bolt 88' in position. A diametrically disposed bolt 92' and a nut 94' threaded thereon serve similarly to secure the tongues 80' and 82' pivotally to the shaft 84'.

Before describing the pivotal mounting provided at the upper end of the elongated planar member 70', the operation of the lower end pivotal mounting already described will first be explained. In the first place, the shaft 84' is pivotally mounted on the bracket 86'. This permits rotation of the member 70' about the axis B'—B' (FIG. 4). The pivoting movement permitted by the bolt 88' allows rotation of the tubular member 72' about axis C'—C' (FIG. 5) while the bolt 92' permits rotation of the tubular member 74' about the axis D'—D' (FIG. 4). Rotation of the elongated planar member 70' about the axis E'—E' is, however, substantially completely prevented and it is this non-rotatability about the axis E'—E' which ensures that the wheel 22' is always disposed in a rearwardly/forwardly directed vertical plane perpendicular to the transverse direction. It will be appreciated that it is not necessary to form the elongated planar member 70' from the two tubular members 72' and 74' and that one such member might be sufficient provided that the tongues 76' and 78' of such a member, namely member 72', were sufficiently wide to prevent rotation of the member about the axis E'—E'. It is for this reason that the member 70' is herein referred to as an elongated planar member. It is only by providing such a member with a significant rearward-forward width that rotation about its longitudinal axis E'—E' can be prevented.

An alternative construction for the elongated planar member and its pivotal securement to the axle-bearing plate 34' is shown in FIGS. 8 and 9. In this embodiment the axle-bearing plate 34' is pivotally connected to an elongated planar member 96' having a generally rectangular cross-sectional configuration. This member 96' terminates at its lower end in a reduced thickness tongue 98' which extends through an axially elongated and diametrically extending slot 100' provided in a shaft 102' rotatably mounted about axis B"—B" in the flanges 103', 105' of a U-shaped bracket 104' secured to the axle-bearing plate 34'. A rivet 106' extends diametrically through the shaft 102' and through the tongue 98' to permit limited rotation of the member 96' about the axis C"—C". It will be understood that twisting of the member 96' about its longitudinal axis E"—E" is not, however, possible.

It will now be understood that the axes E'—E' and E"—E" correspond to the longitudinal axes of the elongated planar members hereinbefore mentioned while the axes B'—B' and C'—C' (with D'—D') or B"—B" and C"—C" correspond to the mutually perpendicular third and fourth axes hereinbefore mentioned.

Referring again to the construction shown in FIGS. 4 and 5 in which the elongated planar member 70' is constituted by the two tubular members 72' and 74', reference will now be made to FIGS. 6 and 7 which show a corresponding pivotal mounting for the upper end of the corresponding elongated planar member 70. In the construction shown, each tubular member 72 and 74 terminates at its upper end in a pair of axially extending tongues 108, 110 and 112, 114 respectively. The tongues 108, 110 are in diametrically disposed tangential abutment to a generally horizontal cylindrical shaft 120 and are pivotally secured thereto by a bolt 116 extending diametrically through the shaft 120. The tongues 112, 114 are similarly secured to the shaft 120 pivotally by a bolt 118. The bolts 116 and 118 are held in place by nuts 124 and the shaft 120 is pivotally mounted through flanges 123 of a U-shaped bracket 122 secured in turn to the side edge 55 of the spine 26. A cover plate 126 secured to the bracket 122 by a set screw 128 provides protection for the pivot against dirt and moisture.

It will further be appreciated that the axis M—M of FIG. 6 is always parallel to the axis B—B corresponding to the axis B'—B' of FIG. 4 and that the axis E—E is the single one of the three orthogonal axes about which the elongated member 70 is not rotatable.

Referring again to FIGS. 1 and 2, it will be seen that the wheels 22 and 22' are associated with drive transmission arms 130 and 130' respectively. At its lower end, the generally tubular arms 130' is secured to the tubular members 38' and 40' (FIG. 4) by bolts 132' passing therethrough and through plates 134' and 136' disposed on each side thereof. At its upper end, the arm 130 terminates in a section 138 substantially parallel to the longitudinal axis of the spine 26 (see FIGS. 10 and 11). This section 138 is axially fixed but rotatably mounted in upper and lower bearing brackets 140 and 142 respectively which are secured to the transverse side edge 55 of the spine 26. Split pins 154 passing through holes provided in the section 138 serve to secure the upper end of the section 138 against axial movement through the bracket 140.

A laterally movable hollow tubular member 144 is disposed coaxially about the section 138 and has a pair of diametrically opposed helical slots 146 and 148 therethrough in which there are slidingly received a pair of radially outwardly extending and diametrically opposed pins 150 and 152 integrally formed with the section 138.

A single laterally movable element or strip 156 mounted on the spine 26 for lateral movement therealong, i.e. along the aforementioned longitudinal axis thereof, is secured by flanges 158 and 158' to transversely extending arms 160 and 160' respectively which extend around the transverse side edges 55 and 55' respectively of the spine 26. Each arm 160, 160' is secured by a collar 162, 162' respectively to the tubular members 144, 144' respectively for transmitting lateral movement thereto.

The laterally movable strip 156 is mounted for lateral movement with respect to the spine 26 in a U-shaped bracket 164 secured to the spine 26 substantially centrally thereof. A cover 166 may be mounted over the helical gear 144 as shown in FIG. 1 for the protection of that mechanism.

As hereinbefore stated, the present invention is particularly directed to the provision of collapsible golf carts and in the construction for such a golf cart as illustrated in the accompanying drawings, a golf club-receiving structure indicated generally at 168 is secured to the spine 26 rearwardly thereof. In the particular construction illustrated (FIG. 12), this structure 168 comprises generally upright rigid forward members 170 and 172 and generally horizontal forward upper and lower transverse members 174 and 176 respectively defining the aforementioned spine 26. Intermediate transverse members 173 and 175 are usefully included to provide rigid support for the bracket 164 and for the handle pivoting bracket as will hereinafter be explained. A pair of rearwardly extending upper frame members 178 and 180 and a pair of rearwardly extending lower frame members 182 and 184 are connected to sloping rearward side members 186 and 188 which, with their upper and lower transverse members 190 and 192 respectively, define the skeletal framework of the golf club-receiving structure 168.

On each of its outer generally vertical faces, the structure 168 may be covered with a suitable sheet material and, in the construction shown in the drawings, the frame is shown as being covered by a stretched leather material or synthetic plastic sheet material 194. In its rearwardly directed surface, the structure 168 is usefully provided as shown with zippered fasteners 198 and 200 to permit access to upper and lower compartments 202 and 204 respectively separated from each other by a horizontal dividing wall 206 and from the forward part of the cart by an oblique wall 207. These compartments 202 and 204 are suitable for the storage of items such as shoes, towels, clothing, etc.

Additional pockets and pouches such as pouch 208 may be provided on the structure 168.

The upper end of the golf club-receiving structure 168 is closed by a flat plate 210 having a plurality of circular apertures 211 (FIG. 2) therethrough and a corresponding number of hollow tubular members 212 for individually receiving golf clubs extend through these circular apertures. At their lower ends, these tubular members 212 are flattened to non-circular configurations as shown in FIGS. 12 to 14 and extend through transverse slots 214 provided for this purpose in a base plate 216 secured to the frame members 176, 182, 184 and 192. The tubular members 212 are secured against vertical movement by a suitable anchoring means such as split pins 218 (FIG. 13) extending through the lower ends of the tubular members 212. It should also be noted that, by providing the tubular members 212 with perforated lower ends, the drainage of moisture, e.g., rainwater, therefrom is facilitated.

A further advantage resulting from the provision of the golf club-receiving hollow tubular members 212 with flattened lower ends is that they are able to support the handles of golf clubs such as club 220 frictionally against rotation therein. This optional feature has been found to be of considerable practical importance.

Another optional feature of the carts of the present invention which is also illustrated in the accompanying drawings involves the provision of a pivotable but non-rotatable ground-engaging member. This member is pivotable between an extended or lowered ground-engaging position and a retracted or raised non-ground-engaging position. Such a member is useful for preventing the cart rolling on an inclined ground surface while still permitting the cart to be pulled along the ground after tilting the cart so that the ground-engaging member is no longer in engagement with the ground.

In the construction illustrated, such ground-engaging member is in the form of a rod bent to form two prongs 221 and 222 (FIG. 14) and having intermediate transverse portions 224 and 226 pivotally secured to the base plate 216 by saddle clips 228 and 230 respectively for pivotal movement in the directions of the arrows F and F' (FIG. 15). A spiral spring 232 surrounds the portion 224 and has an arm engaging an intermediate transverse central portion 234 displaced outwardly from the portions 224 and 226 so as to urge the prongs 221 and 222 forwardly in the direction of the arrow F'. A plate 236 secured to the portion 234, for example, by welding, is abutted by a lever arm 238 pivotally secured centrally thereof on a generally horizontal axis 240 mounted on a U-shaped bracket 241 secured to the base plate 216 for movement between the positions shown in solid and in broken lines in FIG. 15.

At its forward end, the lever arm 238 is connected by a bolt 242 to a downward tubular extension 243 of the laterally movable strip 156. Referring particularly to FIGS. 14 to 16, it will be seen that the lower extremity of this tubular extension 243 is coaxially disposed about bolt 242 and slidingly accommodates a nut 246 threaded onto the upper end of the bolt 242. A helical compression spring 248 disposed about the bolt 242 is retained in place at its lower end by a nut 250 threadingly received on a bushing 252 suitably secured to the lower end of the tubular portion 243. This structure comprises the extensible linkage hereinbefore mentioned.

Referring further to FIGS. 1 and 2, it will be seen that, in accordance with a preferred feature of the invention, the upper end of the laterally movable strip 156 is pivotally connected at 254 to the lower end of a linkage arm 256, the upper end of which is connected by clip 260 to a retractable handle 262 provided at its outer end with a tubular handpiece 264. The handle 262 is pivoted about a pin 266 supported in forwardly extending flanges 268 and 270 of a bracket member 272 secured to the intermediate member 175 of the spine 26 for movement between the positions shown in FIGS. 1 and 2. The flanges 268 and 270 have arcuate slots 274 and 276 respectively therethrough within which there is received for movement therealong a bolt 278 fixed to the inner end of the handle 262. From FIGS. 1, 2, 17 and 18, it will be seen that the bolt 278 is provided with a winged head 280 and that it extends through a pair of plates 282 and 284 disposed transversely outwardly of the flanges 268 and 270 respectively. The pin 266 also extends through these plates 282 and 284 and through intermediate washers 286, and split pins 288 passing through holes in each end of the pin 266 retain these plates 282 and 284 pivotally thereon. The bolt 278 is threadingly received within plate 284 and freely rotatably through plate 282 but pin means (not shown) are provided for preventing axial movement of plate 282 with respect to bolt 278. Intermediate washers 290 are provided on bolt 278. A pair of inwardly extending pins 292 are provided on each of the plates 282 and 284 for removable engagement with corresponding holes 294 provided through flanges 268 and 270 for the purpose of locking the handle 262 in any of its required positions on tightening of the bolt 278.

Having described the structure of the cart 20 shown in the accompanying drawings, the functioning of the various structural components will now be described. Assuming that the cart has its wheels 22 and 22' and its handle 262 in the retracted positions shown in FIG. 2 and that it is desired to move these structural components to their extended positions as shown in FIG. 1, the cart 20 is first tipped forwardly so that the forward end of the lever arm 238 is resting on the ground and the wheels 22 and 22' are free for transverse outward movement across the ground. The bolt 278 is then unscrewed by turning its winged head 280 until the plates 282 and 284 are sufficiently transversely separated for the pins 292 to be retracted from the holes 294. The handpiece 264 of the handle 262 is now grasped and moved forwardly about the pivot pin 266. This movement causes the laterally movable strip 156 to move laterally upwardly with respect to the spine 26 until the forward end of the lever arm 238 engages the lower end 30 of the spine 26. The resulting pivoting of the lever arm 238 about the pivot pin 240 causes the rearward end of the lever arm 238 to move the plate 236 against the action of spiral spring 232 in the direction of the arrow F to the position shown in FIG. 14. During this operation, the wheels 22 and 22' are extended partially from their retracted positions shown in FIG. 2.

At this time, the cart 20 is tipped rearwardly until the prongs 221, 222 engage the ground and the wheels 22 and 22' are free to complete their movement transversely across the ground. Continued forward and upward movement of the handle 262 causes further upward lateral movement of the strip 156 and this lateral movement is further transmitted to the tubular members 144 and 144' which, by the engagement of their helical slots 146, 148 and 146', 148' with the pins 150, 152 and 150', 152' respectively, causes the wheels 22 and 22' to be moved by the drive transmission arms 130, 130' respectively to their extended positions as shown in FIG. 1. During this further upward lateral movement of the strip 156, the lower tubular portion 243 thereof moves upwardly with respect to bolt 242 compressing spring 248. The winged head 280 of bolt 278 is then rotated to move the pins 292 on plates 282 and 284 into the holes 294 in the flanges 268 and 270.

When it is desired to retract the wheels 22 and 22' into the positions shown in FIG. 2, the winged head 280 of bolt 278 is first unscrewed and the cart is then tipped rearwardly to be supported on the ground by the prongs 221 and 222. The handle 262 is then pivoted downwardly and rearwardly to move the wheels 22 and 22' rearwardly by the interaction of the slots 146, 148 and 146', 148' with the pins 150, 152 and 150', 152' respectively. When the wheels 22 and 22' are partially retracted, the cart 20 is tipped forwardly to allow the retraction of the wheels transversely across the ground to be completed and the lever arm 238 to be pivoted about the pivot pin 240 to the position shown in broken lines in FIG. 15. This in turn allows the plate 236 carrying the prongs 221 and 222 to move into its retracted position under the influence of the spiral spring 232. The handle 262 is then locked in its retracted position by tightening the bolt 278.

The embodiments of the invention in which an exclusive privilege or property is claimed are defined as follows:

1. A cart having an elongated rigid spine with a longitudinal axis, an upper end and a lower end, a ground-engaging wheel mounted on a stub axle, said stub axle in turn being mounted on an upright axle-bearing plate to permit rotation of said wheel, a generally horizontal arm pivotally secured to said spine in proximity to said lower end thereof about a first axis substantially parallel to said longitudinal axis of said spine and pivotally secured to said axle-bearing plate about a second axis substantially parallel to said first axis to permit movement of said wheel between an extended position transversely displaced from said spine and a retracted position disposed rearwardly of said spine, a rigid elongated planar member having a longitudinal axis, an upper end and a lower end, the lower end of said elongated planar member being pivotally secured to said axle-bearing plate for pivotal movement about mutually perpendicular third and fourth axes each of which is perpendicular to said longitudinal axis of said elongated planar member, the upper end of said elongated planar member being pivotally secured to said spine intermediate said upper end and said lower end of said spine for pivotal movement about fifth and sixth axes parallel to said third and fourth axes respectively, said second and third axes being perpendicular to each other, control means comprising a laterally movable element slidably secured to said spine, a helical gear connecting said laterally movable element of said control means to a drive transmission arm connected in turn to said horizontal arm whereby lateral movement of said laterally movable element imparts rotational movement through said helical gear to said drive transmission arm to move said wheel between said extended position and said retracted position.

2. A cart as claimed in claim 1 which comprises a pair of retractable wheels, each of said wheels being mounted on said axle-bearing plate connected to said spine and to said laterally movable element of said control means in the manner specified in claim 1.

3. A cart as claimed in claim 2 in which said spine is adapted removably to support rearwardly thereof a container and in which both said wheels are adapted for movement between axially aligned extended positions transversely displaced from said spine and retracted positions in which said wheels are transversely aligned and rearwardly disposed of said spine.

4. A cart as claimed in claim 2 in which a golf club-receiving structure is rearwardly secured to said spine and in which said wheels are adapted for movement between axially aligned extended positions transversely displaced from said spine and retracted positions in which said wheels are transversely aligned and rearwardly disposed of said spine.

5. A cart as claimed in claim 4 which comprises a plurality of individual golf club-receiving tubular members, each having an upper end and a lower end, said lower ends of said tubular members being secured against vertical movement out of said cart and being perforated to permit the drainage of moisture therefrom.

6. A cart as claimed in claim 1 in which a handle pivotally secured to said spine in proximity to said upper end thereof for movement between a retracted position in alignment with said spine and an extended position in which said handle extends forwardly and upwardly from said spine to cause lateral movement of said laterally movable element whereby said wheel is disposed in its retracted position when said handle is in its retracted position and said wheel is in its extended position when said handle is in its extended position.

7. A cart as claimed in claim 2 in which each said helical gear comprises a hollow cylindrical member having a helical slot therethrough and being rigidly secured to said laterally movable element for lateral movement therewith and in which said drive transmission arm comprises a portion coaxially and rotatably disposed within said hollow cylindrical member and having a radially extending pin extending outwardly through said helical slot whereby lateral movement of said hollow cylindrical member imparts rotational movement to said drive transmission arm.

8. A cart as claimed in claim 7 in which a pair of rearwardly extending side walls are secured to the sides of said spine, in which each said generally horizontal arm and the upper end of each said elongated planar member are pivotally secured to the respective side wall, in which each said hollow cylindrical member is disposed coaxially with an upper portion of the respective one of said drive transmission arms coaxially with the respective one of said first axes, in which each said hollow cylindrical member is rigidly interconnected to said laterally movable element mounted on said spine, and in which each said hollow cylindrical member comprises a pair of diametrically opposed helical slots adapted to engage a pair of diametrically opposed radially extending pins provided on the respective drive transmission arm.

9. A cart as claimed in claim 1 in which each of said lower and upper ends of said elongated planar member extends through an axial slot in a generally cylindrical shaft, which shaft is pivotally mounted for rotation about its longitudinal axis, in which said longitudinal axes of said shafts at the lower and upper ends of said elongated planar member constitute said third and fifth axes respectively, and in which said elongated planar member is pivoted at each of its upper and lower ends about a pin extending through said elongated planar member and diametrically through the respective generally cylindrical shaft, said pins at the lower and upper ends of the elongated planar member constituting said fourth and sixth axes respectively.

10. A cart as claimed in claim 1 in which said elongated planar member terminates at each of its upper and lower ends in a pair of mutually separated axially extending tongues disposed in diametrically opposed tangential abutment with a generally cylindrical shaft which is pivotally mounted for rotation about its longitudinal axis, in which said longitudinal axes of said generally cylindrical shafts at the lower and upper ends respectively of said elongated planar member constitute said third and fifth axes respectively, in which said elongated planar member is pivotally connected to said generally cylindrical shafts by pins extending diametrically through said shafts and through said axially extending tongues, and in which said pins at the lower and upper ends of said elongated planar member constitute said fourth and sixth axes respectively.

11. A cart as claimed in claim 10 in which said axle-bearing plate is connected to said spine by at least two said elongated planar members.

12. A cart as claimed in claim 1 which comprises a non-rotatable ground-engaging member adapted for movement between a lowered ground-engaging position and a raised non-ground-engaging position and in which said laterally movable element is adapted to move said non-rotatable ground-engaging member between its lowered and raised positions conjointly with the movement of said wheel between its extended and retracted positions respectively.

13. A cart as claimed in claim 12 in which said non-rotatable ground-engaging member is pivotally mounted on a base plate secured to said spine for pivotal movement of said non-rotatable ground-engaging member between its raised and lower positions, in which said ground-engaging member is urged by spring means into its raised position, and in which a lever arm connected to said laterally movable element and in abutting relationship with said ground-engaging member serves to move said ground-engaging member between its raised and lower positions on lateral movement of said laterally movable element.

14. A cart as claimed in claim 13 in which said lever arm is connected to said laterally movable element through an extensible linkage.

References Cited
UNITED STATES PATENTS 2,810,586  10/1957  Troka _____ 280—40
2,957,707  10/1960  Zagwyn _____ 280—124

LEO FRIAGLIA, Primary Examiner

R. R. SONG, Assistant Examiner